E. D. CLAPP.
STEERING MECHANISM.
APPLICATION FILED JAN. 18, 1912.
1,139,399.
Patented May 11, 1915.
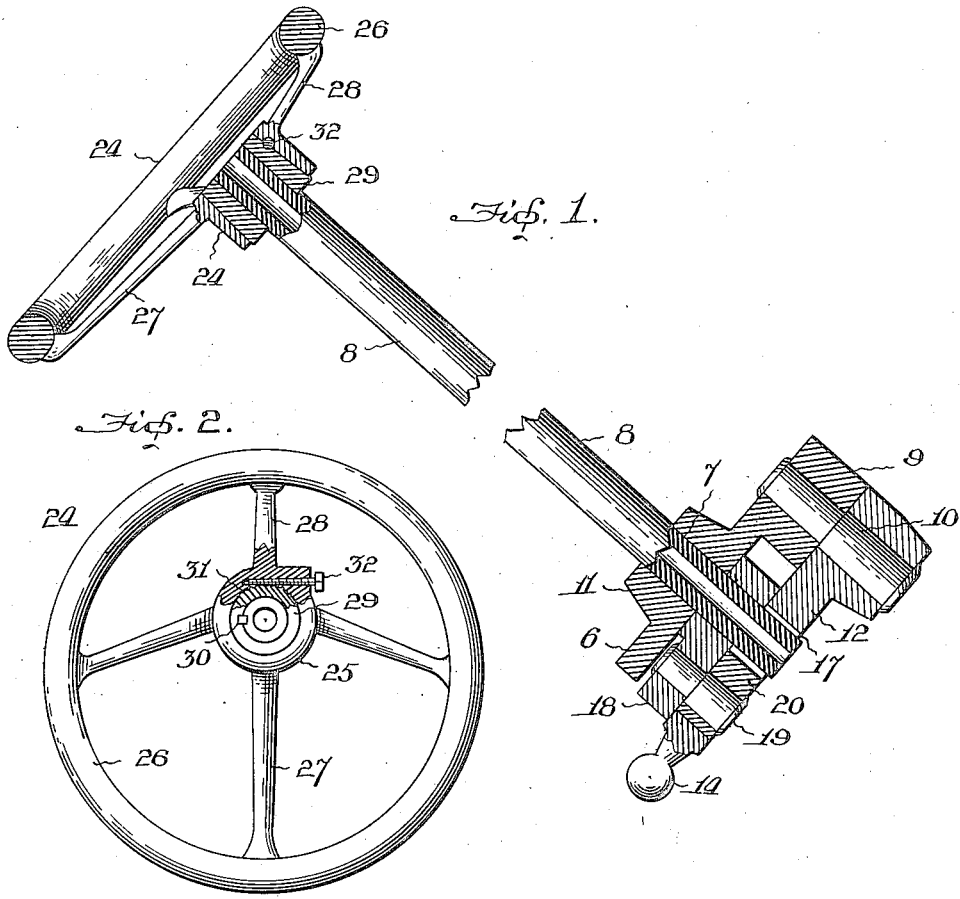

UNITED STATES PATENT OFFICE.

EDWARD DWIGHT CLAPP, OF WASHINGTON, DISTRICT OF COLUMBIA.

STEERING MECHANISM.

1,139,399.  Specification of Letters Patent.  Patented May 11, 1915.

Application filed January 18, 1912. Serial No. 671,829.

*To all whom it may concern:*

Be it known that I, EDWARD DWIGHT CLAPP, a citizen of the United States, residing in the city of Washington, District of Columbia, have invented certain Improvements in Steering Mechanism, of which the following is a full and complete specification.

This invention is an improvement in steering mechanism for vehicles, and relates more especially to devices of this character which are employed in connection with automobiles or motor vehicles.

The primary object of my invention is to provide a steering mechanism for motor vehicles which shall be strong and durable in construction, positive and effective in operation, and which is not liable to get out of order.

A further object of my invention is to provide the steering-mechanism with an operating-wheel of such construction that it will afford a better leverage, and will also accurately indicate to the driver the disposition of the steering-wheels.

Other objects and advantages of the invention will hereinafter appear, and what I particularly claim as my invention, and desire to secure by Letters-Patent, is specifically set forth in the appended claims.

In the accompanying drawings, which form a part of this specification: Figure 1 is a side view, partly in section, illustrating a steering-mechanism constructed in accordance with my invention. Fig. 2 is a plan view of the steering-wheel, a part of the hub being broken away to show the means of adjustment.

My improved guiding-wheel is applied to a steering-post 8, having a positive connection with the usual rod for shifting the steering-wheels of the motor-vehicle, so that said guiding-wheel will maintain its position with relation to that of the steering-wheels, for the purpose hereinafter explained. The connection in the present instance, as shown in Fig. 1, consists of an attaching plate 6 having a boss 11 for the passage therethrough of the steering-post, and an opposite boss 9 carrying a pin 10 forming a fulcrum for a shifting lever 12, the latter being operated by an arm 18 projecting from the steering-post between the attaching-plate and lever and connected to said lever by a pin 19 and sliding-block 20. The lever is fulcrumed at one side of the steering-post and connected to the steering-rod (not shown) at the other side thereof, as at 14, the steering-post extending into a transverse slot 17 in the lever to permit movement of the latter.

In the present instance the steering-post is provided at its upper end with a guiding-wheel 24, of a peculiar construction, whereby it will not only serve as an effective means for turning the steering-post but will also indicate to the driver of the motor-vehicle the exact disposition of the steering-wheels. For this purpose the hub 25 of the guiding-wheel is arranged eccentric to the rim, 26, and this provides for a long spoke 27 at one side of the hub and a short spoke 28 at the other side, and in the application of this guiding-wheel the latter is arranged so that the longer spoke is toward the driver when the steering-wheels are disposed to guide the motor-vehicle in a straight line either forward or backward; in other words the long spoke is parallel with the longitudinal center of the vehicle when the steering-wheels are correspondingly disposed; whereby in the operation of said guiding-wheel the driver may know at a glance the exact disposition of the steering-wheels, and this is especially helpful in backing the vehicle, or when it is skidding. This particular form of guiding-wheel also has the advantage of affording a greater leverage than the ordinary guiding-wheel of the same size; for by grasping the rim of the wheel at either side of the outer end of the longer spoke the application of the power is farther from the fulcrum—the steering-post—than in the case of an ordinary guiding-wheel in which the hub is concentric.

In order to adjust the guiding-wheel, so that the longer spoke may be disposed to correspond with the position of the steering-wheels, I provide the steering-post with a sleeve 29, fixed thereto by a key 30 (Fig. 2), and having a series of peripheral teeth 31, with which latter engages the thread of a screw 32, threaded into the hub from one side thereof. In adjusting the guiding-wheel the screw is turned out of engagement with the peripheral teeth, and after turning the wheel upon the sleeve to the proper position said screw is turned to again engage the teeth. In practice I purpose using what is termed a "tap-screw," which is slightly tapered so as to bind between the hub and sleeve.

Having thus described my invention, I claim:

1. In a steering mechanism, a guiding-wheel for the steering-post having a hub at one side of the center of the wheel for attachment to the steering-post, substantially as shown and for the purpose set forth.

2. In a steering mechanism, a guiding-wheel for the steering-post having a hub at one side of the center of the wheel for attachment to the steering-post, and a spoke extending from said hub through the center of the wheel to the rim, substantially as shown and for the purpose set forth.

3. In a steering mechanism, a guiding-wheel for the steering-post comprising a circular rim, a hub arranged eccentric to the rim and receiving the steering-post, and means for holding the guiding-wheel in different adjusted positions.

4. In a steering mechanism for motor vehicles, the combination with the steering-post, of a guiding-wheel, comprising a hub connected to the steering-post, a circular rim or ring arranged eccentrically with relation to the hub, a spoke extending from the hub to the rim and connected to the latter at the point farthest from the hub to provide a long indicating spoke, short spokes extending from the hub to other parts of the rim and coöperating with the long spoke to indicate direction, and means for adjustably connecting the wheel to the steering-post to properly position said wheel and its indicating-spokes with relation to the steering mechanism, and steering-wheels of the vehicle, substantially as shown and described.

5. In a steering mechanism for motor vehicles, the combination with the steering-post, of a guiding-wheel comprising a hub, a circular rim or ring arranged eccentrically with relation to the hub, a spoke extending from the hub to the rim and connected to the latter at the point farthest from the hub to provide a long indicating-spoke, and shorter spokes extending from the hub to the rim and coöperating with the long spoke to indicate direction; together with a screw threaded through the hub tangentially, and peripheral threads on the steering-post with which the screw engages to connect the parts, and whereby the wheel may be adjusted on the steering-post to properly position the indicating spokes thereof with relation to the steering-mechanism and steering-wheels of the vehicle, substantially as shown and described.

EDWARD DWIGHT CLAPP.

Witnesses:
H. P. HOWARD, Jr.,
D. R. HERSHEY.